Patented Sept. 17, 1929

1,728,217

UNITED STATES PATENT OFFICE

KARL SCHIRMACHER AND KONRAD RENN, OF HOCHST-ON-THE-MAIN, GERMANY, ASSIGNORS TO GENERAL ANILINE WORKS, INC., OF NEW YORK, N. Y., A CORPORATION OF DELAWARE

PROCESS FOR PREPARING A DIAZO COMPOUND FROM AN AMINE OF THE AROMATIC SERIES

No Drawing. Application filed March 24, 1927, Serial No. 178,133, and in Germany March 30, 1926.

Our present invention relates to a new method of preparing diazo compounds. It offers particularly great advantages in the diazotization of aromatic amines containing many negative substituents, such as halogen, nitro- or hydroxy-groups. Such amines, which are scarcely still of a basic character, can be diazotized by the usual methods only with great difficulty or not at all.

Now we have found that the diazo compound of such an amine can be easily obtained by causing halogensulfonic acid, or an ester thereof, to act upon the said amine in the presence of a tertiary base and treating the sulfamic acid thus obtained with nitrous acid. The salts of these sulfamic acids, which are more or less readily soluble in water, are thereby easily transformed into the corresponding diazo compounds with loss of the sulfo residue, provided that the temperature is raised sufficiently to initiate and complete the reaction. The temperature at which the best yield may be obtained can easily be ascertained by experiments with each individual compound.

Our new process permits to convert amines, the diazotization of which by the usual methods can only be carried out in presence of a large quantity of water, into a readily-soluble form, so that it is possible to obtain concentrated diazo solutions therefrom.

If in the following examples is used instead of a halogensulfonic acid an ester thereof and the process otherwise carried out in the same manner, the same result is obtained; in this case identical sulfamic acids are obtained.

The following examples serve to illustrate our invention, but they are not intended to limit it thereto; the parts are by weight unless otherwise stated:

1. Into 100 parts of dry pyridine are introduced by drops 18 parts of chlorosulfonic acid, during which operation the violent reaction is moderated by cooling and the temperature kept at 35–40° C. There are then added 16,2 parts of 2.5-dichloraniline, the mixture is kept for ½ hour at 35–40° C. and then poured into a solution of 18 parts of caustic soda in a small quantity of water. The pyridine is expelled by steam-distillation, the alkaline residue is evaporated to a small volume and the sulfamate is precipitated by adding common salt.

20 parts of the precipitated salt, containing 89,2% of the sulfamate, are suspended in 50 parts of water, there are then added 37,4 parts of hydrochloric acid of 20% strength and into this mixture is run, while stirring, a solution of 4,7 parts of sodium nitrite in some water, so that the diazo compound separates as a difficultly soluble body. When the quantity of the water is increased, a clear diazo solution is obtained. The temperature should not exceed 25° C.

The process takes place according to the following formulas:

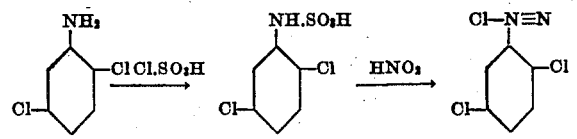

2. If the 2.5-dichloraniline as used in Example 1 is replaced by 17,6 parts of 2.5-dichlor-4-toluidine, the sodium salt of the 2.5-dichlor-4-toluidinesulfamic acid is obtained. This salt is rather difficultly soluble in cold water, readily soluble in hot water.

20 parts of this salt, containing 87,5% of the pure sulfamate are dissolved or suspended in 300 parts of water at ordinary temperature, there are then added 34 parts of hydrochloric acid of 20% strength and gradually added thereto, while stirring, the solution of 4,4 parts of sodium nitrite, whereupon a clear diazo solution forms. When using concentrated solutions, the diazo compound is obtained in the form of a yellowish-white crystalline powder.

3. If the 2.5-dichlor-4-toluidine as used in Example 2 is replaced by an equal quantity of 2.3-dichlor-4-toluidine, the sodium salt of 2.3-dichlor-4-toluidinesulfamic acid is obtained which behaves like its isomeride mentioned in Example 2.

20 parts of this salt containing 66,8% of the pure sulfamate are dissolved or suspended in 100 parts of water and after adding 30 parts of hydrochloric acid of 20% strength there are introduced, while stirring, a solution of 3,9 parts of sodium nitrite in 15 parts of water. The resulting diazo compound precipitates in the form of a white powder. It has the following formula:

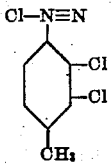

4. Into 150 parts of dry pyridine are dropped at a temperature not exceeding 35–40° C. 36 parts of chlorosulfonic acid. After having added to this mixture 19,6 parts of 3.4.5-trichloraniline, it is heated to 80–95° C. for one hour, poured into a solution of 36 parts of caustic soda in a small quantity of water and the pyridine is expelled by steam. If necessary, the solution is freed by filtration from any mechanical impurities and after evaporation, the sodium sulfamate of the 3.4.5-trichloraniline is precipitated by adding common salt. It is difficultly soluble in cold water, readily soluble in hot water.

In order to prepare the diazo compound, 25 parts of the product containing 88% of the pure sulfamate are suspended in a small quantity of water at a temperature of 30–40° C., this suspension is rendered acid towards congo paper by adding 35 parts of hydrochloric acid of 20% strength and there is then introduced, while stirring, a concentrated solution of 4,46 parts of sodium nitrite during which operation the temperature may be allowed to rise up to 40° C. The diazo compound separates as a greyish-yellow voluminous body.

5. Into 100 parts of dry pyridine are introduced, while stirring, at ordinary temperature 48 parts of chlorosulfonic acid. There are then introduced 18 parts of picramic acid and the whole is heated for one hour to 80–85° C. After addition of a solution of 63,6 parts of anhydrous sodium carbonate and 8 parts of caustic soda, the pyridine is expelled by distillation with steam and the intensely red clear solution is precipitated with common salt. The disodium salt of the sulfamic acid of the formula:

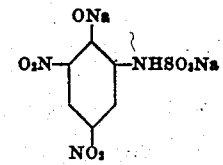

is very readily soluble in cold water, a property which the sodium picramate does not possess. By boiling this disodium salt for a short time with a small quantity of a mineral acid the picramic acid is precipitated.

40 parts of the precipitated disodium salt, containing 48,7% of the pure substance, are dissolved in 60 parts of water and there are then added 40 parts of hydrochloric acid of 20% strength, whereby the red coloration of the disodium salt is superseded by the faintly yellow coloration of the monosodium salt having the formula:

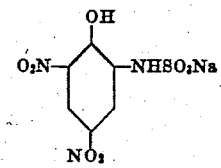

There is then added a solution of 3,85 parts of sodium nitrite in a small quantity of water whereby the yellow diazo compound is obtained in a solid state.

6. Into 300 parts of dry pyridine are dropped at 35–40° C. 36 parts of chlorosulfonic acid, to this mixture are added 39,4 parts of aminoazobenzene and the whole is heated for one hour to 60–65° C. The mass is poured into an aqueous solution of 48 parts of caustic soda and the pyridine is expelled in the usual manner. On cooling, the sodium salt of the aminoazobenzenesulfamic acid crystallizes from the solution. The remainder can be salted out.

For the diazotization, 20 parts of the sodium salt above referred to, containing 82,3% of the pure sulfamate, are suspended in 200 parts of water, and then there are added 30 parts of hydrochloric acid of 20% strength and into the mixture are run, while stirring, a solution of 3,85 parts of sodium nitrite in 25 parts of water. The diazo compound of the aminoazobenzene separates as a brownish, voluminous mass.

It has the following formula:

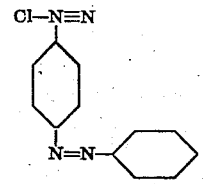

7. If instead of the aminoazobenzene as used in Example 6, 45 parts of aminoazotoluene are employed, there is obtained on cooling the sodium salt of aminoazotoluene-sulfamic acid which is difficulty soluble in cold water.

The diazo compound is obtained as a brownish, voluminous mass by suspending 20 parts of the said finely ground sodium salt containing 91,6% of the pure sulfamate, in 200 parts of water, adding 31 parts of hydrochloric acid of 20% strength and introducing, while well stirring, a diluted solution of 3,9 parts of sodium nitrite.

The diazo compound has the following formula:

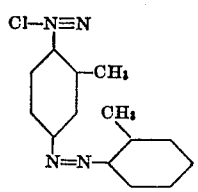

8. Into 200 parts of dry pyridine are dropped at the usual temperature 36 parts of chlorosulfonic acid. There are then introduced 31,8 parts of 5.8-dichlor-1-naphthylamine and after having stirred the mass for one hour at 60° C. it is poured into a diluted solution of 36 parts of caustic soda and the pyridine and any unaltered dichlornaphthylamine which may be present is separated by distillation with steam. The solution contains the sodium salt of the 5.8-dichlor-1-naphthylsulfamic acid which is almost insoluble in cold water.

In order to effect the diazotization, 40 grams of a 73% paste is dissolved in 2400 parts of warm water, there is then added the concentrated solution of 6,4 parts of sodium nitrite and the whole is run at 25–30° C. into a mixture of 145 parts of concentrated sulfuric acid and 400 parts of water. The diazosulfate separates for the most part as a crystalline mass.

It has the following formula:

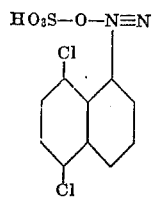

9. Into a suspension, prepared from 150 arts of pyridine and 52,4 parts of chlorosulfonic acid, are introduced 27,3 parts of 3-aminocarbazole; the mixture is kept at 60° C. for one hour, poured into a highly concentrated solution of 76 parts of caustic potash and the pyridine is expelled in the usual manner. The solution contains the di-potassium salt of the carbazole-3.9-disulfamic acid, which is very readily soluble in cold water.

The solution thus obtained is mixed with a solution of 10,3 parts of sodium nitrite and the whole is poured all at once into a mixture of 178,5 parts of concentrated hydrochloric acid and 1200 parts of ice. The diazotization occurs almost immediately and the diazo compound separates as a faint yellowish-green crystalline mass.

It has the following formula:

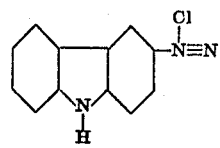

10. Into 150 parts of pyridine are introduced, while stirring, 46,6 parts of chlorosulfonic acid, 37,6 parts of 4-nitro-1-naphthylamine are then added thereto and the whole is heated for ½ hour to 60° C. The mass is poured into a concentrated aqueous solution of 63,6 parts of anhydrous sodium carbonate, the pyridine is expelled with steam, the remaining solution is filtered and the filtrate is salted out with common salt.

The diazotization is effected by dissolving 38,7 parts of the salt containing 75% of the pure sulfamate in 300 parts of warm water, adding a concentrated solution of 6,9 parts of sodium nitrite and introducing the mixture at 25–30° C. into the mixture of 30 parts of concentrated hydrochloric acid and 100 parts of water. In this manner a faintly colored diazo solution is obtained.

It contains the diazo compound of the following formula:

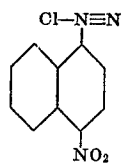

11. The isomeric sodium salt of the 5-nitro-1-naphthylsulfamic acid is prepared according to the directions given in Example 10. It has the same properties as to its solubility, its color is however of a less yellow tint. The diazo compound is obtained therefrom as a clear solution by pouring a solution of 36,2 parts of an 80% paste and of 6,9 parts of sodium nitrite in 300 parts of water into the mixture of 30 parts of hydrochloric acid of 23° Bé. and 100 parts of water, the temperature being kept at 25–30° C.

We claim:

1. The process which comprises converting an aromatic amine containing a plurality of negative substituents, which is difficultly diazotizable owing to the slight basic character and low solubility of its salts prepared with acids, into its sulfamic acid by treating said amine with a compound of the following composition: Hlg.SO$_2$OR wherein Hlg stands for a halogen and R stands for hydrogen or an alkyl group, in the presence of a tertiary organic base, and further treating the sulfamic acid thus obtained with nitrous acid.

2. The process which comprises converting an aromatic amine containing a plurality of negative substituents, which is difficultly diazotizable owing to the slight basic character and low solubility of its salts prepared with acids, into its sulfamic acid by treating said amine with a halogensulfonic acid in the presence of a tertiary organic base, and further treating the sulfamic acid thus obtained with nitrous acid.

3. The process which comprises converting an aromatic amine containing a plurality of negative substituents, which is difficultly diazotizable owing to the slight basic character and low solubility of its salts prepared with acids, into its sulfamic acid by treating said amine with a compound of the following composition: $Cl.SO_2OR$ wherein R stands for hydrogen or an alkyl group, in the presence of pyridine, and further treating the sulfamic acid thus obtained with nitrous acid.

4. The process which comprises converting an aromatic amine containing a plurality of negative substituents, which is difficultly diazotizable owing to the slight basic character and low solubility of its salts prepared with acids, into its sulfamic acid by treating said amine with chlorosulfonic acid in the presence of pyridine, and further treating the sulfamic acid thus obtained with nitrous acid.

5. The process which comprises converting 2.5-dichloraniline into its sulfamic acid by treating said amine at a temperature of 35–40° C. with a compound of the following composition: $Hlg.SO_2OR$ wherein Hlg stands for a halogen and R stands for hydrogen or an alkyl group, which has been mixed with a tertiary organic base at a temperature of 35° C. to 40° C., removing the tertiary base from the solution by an alkaline steam-distillation, separating the sulfamic acid thus obtained, and treating it with nitrous acid.

6. The process which comprises converting 2.5-dichloraniline into its sulfamic acid by treating said amine at a temperature of 35° C. to 40° C. with a halogen sulfonic acid which has been mixed with a tertiary organic base at a temperature of 35° C. to 40° C., removing the tertiary base from the solution by an alkaline steam-distillation, separating the sulfamic acid thus obtained and treating it with nitrous acid.

7. The process which comprises converting 2.5-dichloraniline into its sulfamic acid by treating said amine at a temperature of 35° C. to 40° C. with a compound of the following composition: $Cl.SO_2OR$ wherein R stands for hydrogen or an alkyl group, which has been mixed with pyridine at a temperature of 35° C. to 40° C., removing the pyridine from the solution by an alkaline steam-distillation, separating the sulfamic acid thus obtained and treating it with nitrous acid.

8. The process which comprises converting 2.5-dichloraniline into its sulfamic acid by treating said amine at a temperature of 35° C. to 40° C. with chlorosulfonic acid which has been mixed with pyridine at a temperature of 35° C. to 40° C., removing the pyridine from the solution by an alkaline steam-distillation, separating the sulfamic acid thus obtained and treating it with nitrous acid.

In testimony whereof, we affix our signatures.

KARL SCHIRMACHER.
KONRAD RENN.